United States Patent [19]

Fox

[11] 3,997,009

[45] Dec. 14, 1976

[54] WELL DRILLING APPARATUS

[75] Inventor: Fred K. Fox, Houston, Tex.

[73] Assignee: Engineering Enterprises Inc., Houston, Tex.

[22] Filed: Jan. 31, 1975

[21] Appl. No.: 545,826

[52] U.S. Cl. .............. 175/107; 137/857; 166/325; 166/326; 175/234; 175/243; 175/323; 175/340

[51] Int. Cl.[2] .............. E21B 3/12; F16K 15/18

[58] Field of Search .......... 175/317, 318, 243, 234, 175/235, 232, 38, 107; 166/202, 224 A, 225, 224 R; 137/525, 525.1

[56] References Cited

UNITED STATES PATENTS

| 2,293,259 | 8/1942 | Johnson | 175/318 |
|---|---|---|---|
| 2,740,481 | 4/1956 | Arterbury et al. | 166/202 X |
| 2,858,838 | 11/1958 | Scaramucci | 166/225 X |
| 2,944,794 | 7/1960 | Myers | 166/224 X |
| 2,973,006 | 2/1961 | Nelson | 137/525.1 X |
| 3,205,955 | 9/1965 | Whittle | 175/318 X |
| 3,307,571 | 3/1967 | Smith | 137/525.1 X |
| 3,409,078 | 11/1968 | Knox et al. | 175/318 X |
| 3,461,962 | 8/1969 | Harrington | 175/318 X |
| 3,465,595 | 9/1969 | Tansony | 137/525.1 X |
| 3,566,964 | 3/1971 | Livingston | 166/224 R |
| 3,667,557 | 6/1972 | Todd et al. | 175/318 X |
| 3,703,213 | 11/1972 | Kammerer | 175/318 |

*Primary Examiner*—Ernest R. Purser
*Assistant Examiner*—William F. Pate, III
*Attorney, Agent, or Firm*—W. F. Hyer; Marvin B. Eickenroht

[57] ABSTRACT

Apparatus is disclosed wherein a tubular body connectible in a drill string and having a float valve arranged therein to normally close the string, as the string is lowered into a well bore, is provided with a plurality of ports connecting its bore above the float valve with its exterior, and valve means for movement from a position normally closing to a position opening the ports when the exterior fluid pressure exceeds the fluid pressure in the bore above the float valve by a predetermined amount.

9 Claims, 9 Drawing Figures

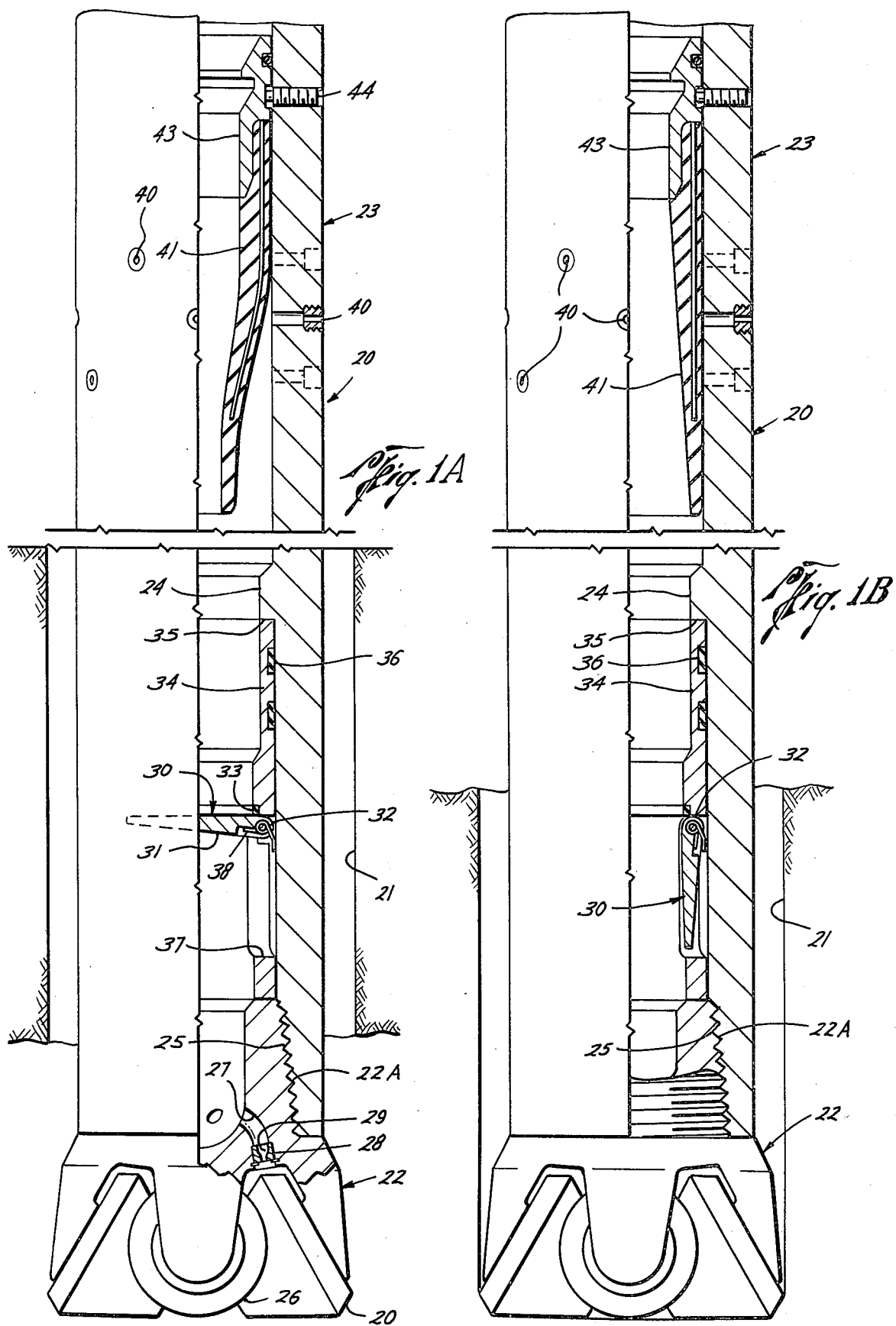

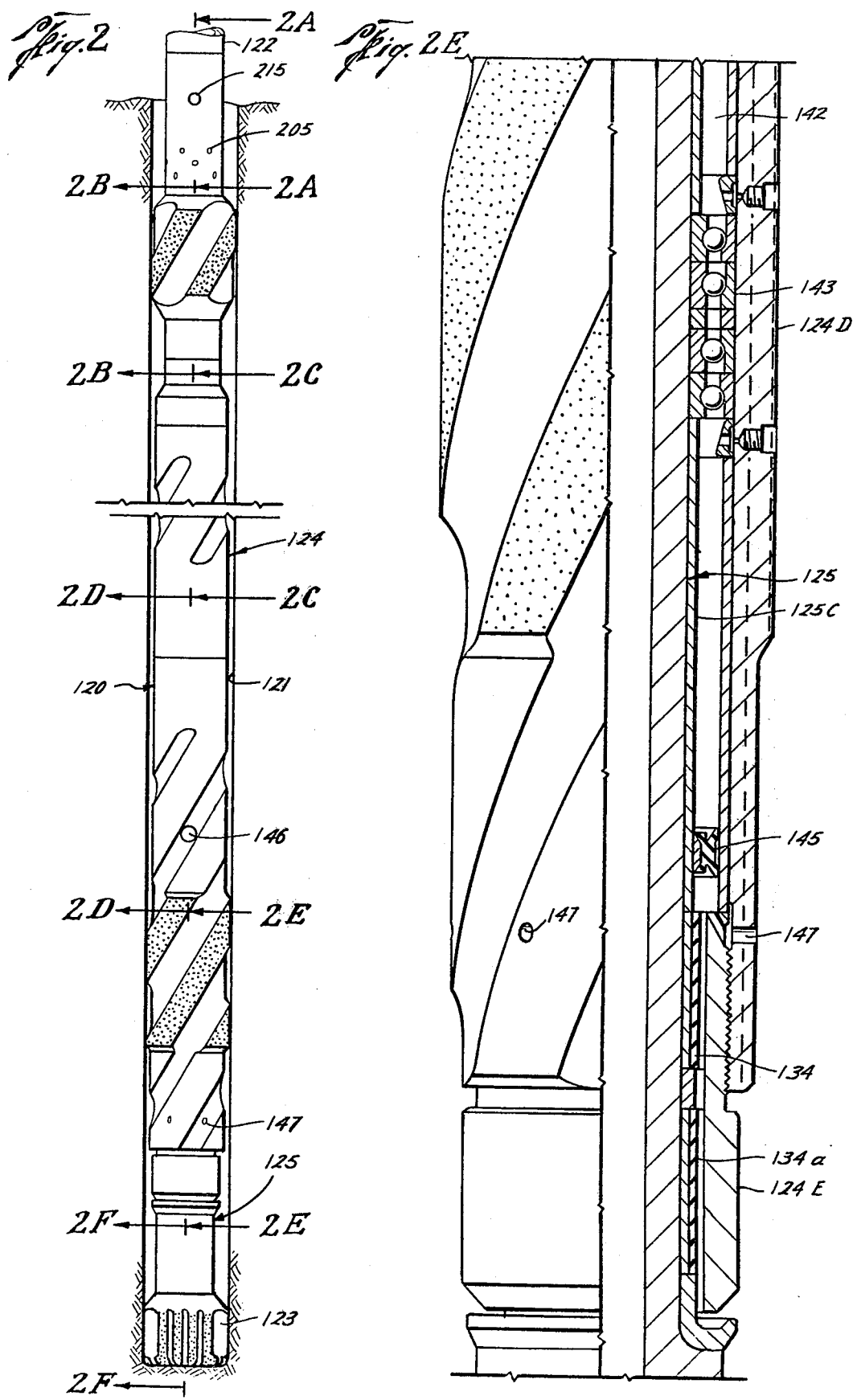

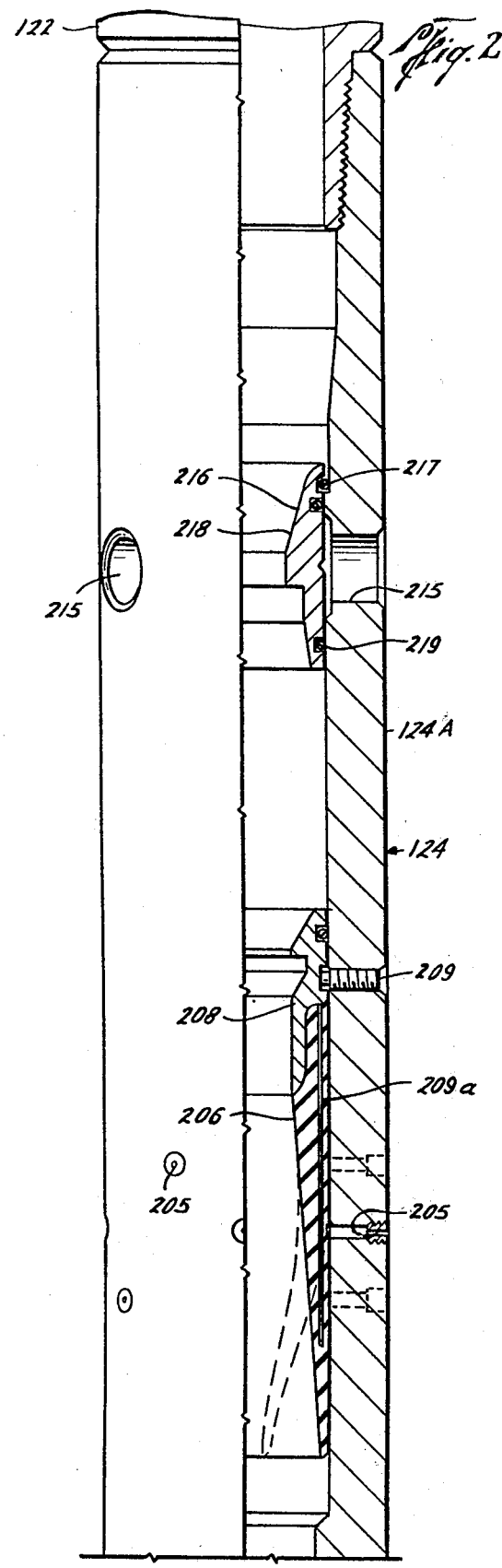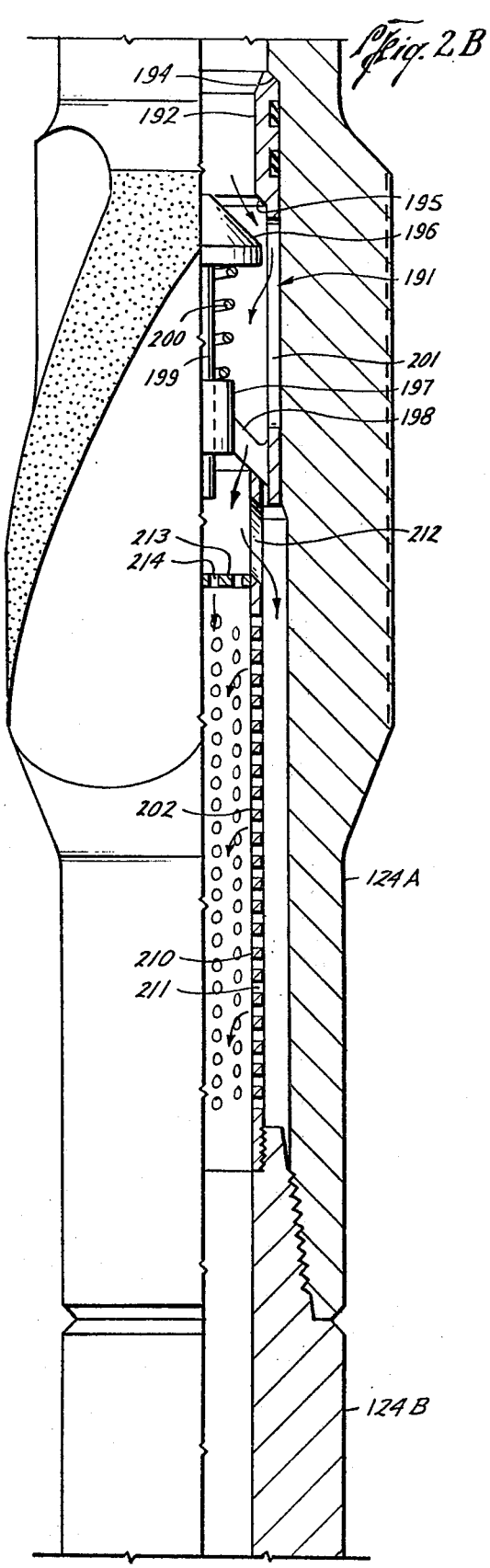

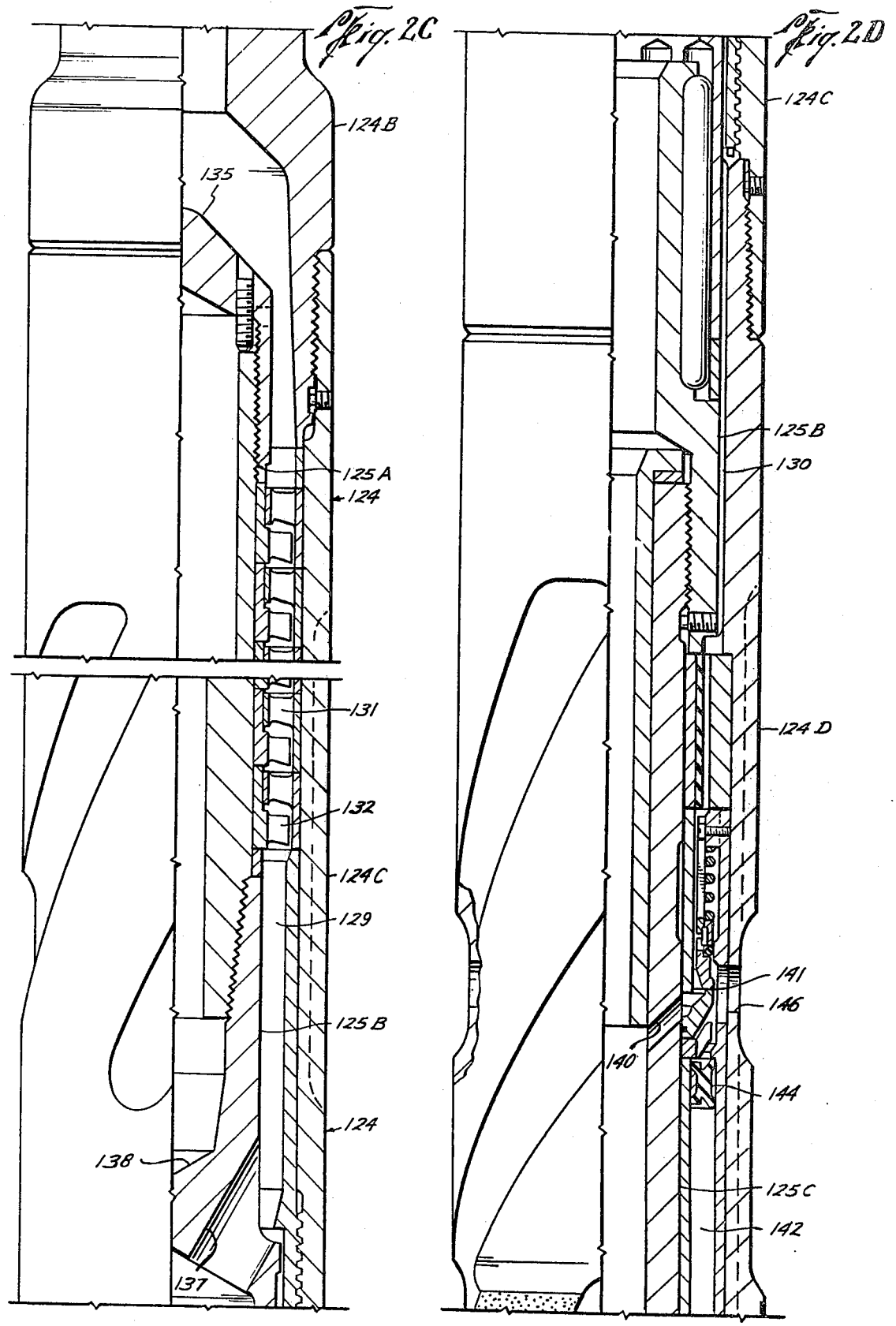

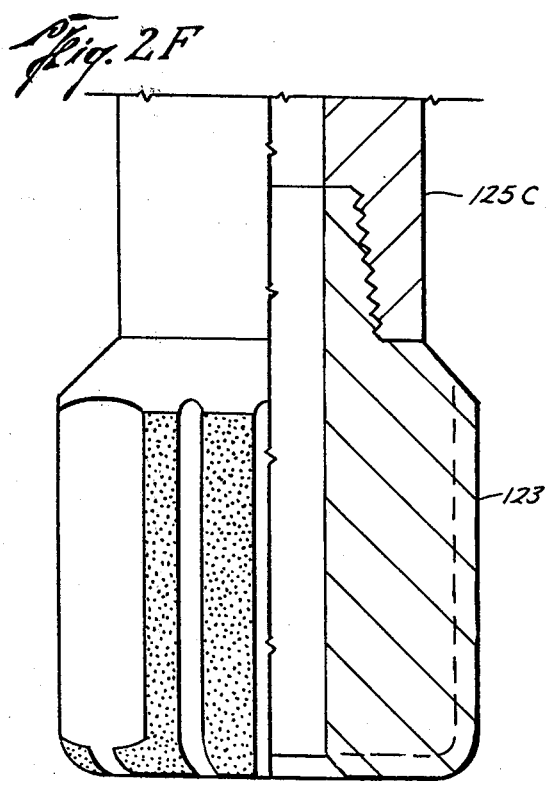

WELL DRILLING APPARATUS

This invention relates generally to apparatus for use in drilling oil and gas wells, and, more particularly, to improvements in apparatus of this type wherein a tubular body connectible in the lower end of a drill string has a float valve arranged therein to close the string in order to prevent cuttings and other debris in the well bore from circulating upwardly therethrough and thereby clogging restricted openings in the string, as it is lowered into the well bore, and then open the string in response to the circulation of drilling mud downwardly through it, when the string has been lowered into drilling position. In one of its aspects, this invention relates to apparatus in which the float valve is arranged to project jet openings in a drill bit on the lower side of the string. In another of its aspects, it relates to apparatus in which the float valve is arranged to protect openings through turbine blades of a turbine motor connected above the bit, such as in a turbodrill.

In using apparatus of this type, it's the practice to fill the interior of the joints of the drill string above the float valve with drilling mud at the surface level, as they are made up and lowered within the well bore, in order to prevent collapse of the string due to the pressure of well fluid in the annulus about it. This, of course, is a slow and expensive procedure, and it is an object of this invention to provide such apparatus in which the restricted openings may be protected without the necessity of filling the drill string in this manner.

This and other objects are accomplished, in accordance with the illustrated embodiments of this invention, by apparatus which includes, as in prior apparatus of this type, a tubular body connectible in the drill string and having a seat in the bore thereof above the restricted openings, and a closure member which is normally urged to a position over the seat to close the bore, as the string is lowered within the well bore, to prevent well fluid from circulating upwardly through them, but which is adapted to be removed from the seat to open the bore, when the drill string is lowered to drilling position, in response to the force of drilling mud which is circulated downwardly within the string. In addition, however, the bore of the tubular body above the closure member is connected with its exterior by a plurality of ports which are normally closed by valve means adapted to be opened in response to a predetermined excess of fluid pressure within the well bore annulus about the drill string above that in the bore of the tubular body. In this way, the string will automatically fill with well fluid as it is lowered into the well bore, and the differential pressure across the tool reaches a certain level, whereby the string may be lowered to drilling position, without danger of collapsing, and drilling mud may be circulated downwardly through it and past the normally closed closure member.

More particularly, in one embodiment of this invention, the tubular body comprises a rotatable shaft member connectible above a drill bit having jet openings therein which are susceptible of clogging; and, in another embodiment, the tubular body comprises a tubular member connectible above and spaced from a rotatable shaft member to provide passageway means in which turbine blades on the members are arranged to cause one to rotate with respect to the other, in response to the circulation of drilling mud through the passageway means, the blades defining openings between them susceptible of clogging. In the second embodiment, there is a screen across the bore of the tubular member intermediate the closure member and the turbine or other motor section, the openings in the screen preferably being of generally the same size as the ports in the tubular member, whereby the restricted openings in the motor section are also protected against clogging due to particles in the fluid which is circulated downwardly therethrough during drilling operations.

In the drawings, wherein like reference characters are used throughout to designate like parts:

FIG. 1A is a vertical sectional view of apparatus constructed in accordance with the first-mentioned embodiment of the present invention, and connected in a drill string just above a drill bit, the closure member in the bore of the member being shown in closed position as the string is lowered within a well bore;

FIG. 1B is a vertical sectional view of the tool of FIG. 1A, but showing the closure member opened upon circulation of drilling mud therepast following lowering of the string into drilling position;

FIG. 2 is an elevational view of a turbodrill connected in a drill string suspended within a well bore, and including apparatus constructed in accordance with the second mentioned embodiment of the present invention disposed above the turbine section thereof;

FIGS. 2A and 2B are enlarged views of an uppermost portion of the turbodrill, partly in vertical section, as indicated by broken lines 2A—2A and 2B—2B, respectively, of FIG. 2, and showing the parts of such apparatus in the positions they occupy during circulation of drilling mud therethrough;

FIG. 2C is an enlarged discontinuous view of an intermediate portion of the turbodrill, immediately beneath the portion shown in FIG. 2B, and also shown partly in vertical section, as indicated by broken lines 2C—2C of FIG. 1;

FIG. 2D is an enlarged view of the next lower portion of the turbodrill, also shown partly in section, as indicated by broken lines 2D—2D of FIG. 1;

FIG. 2E is another enlarged view of a still further lower portion of the turbodrill, also shown in partial section, as indicated by broken lines 2E—2E of FIG. 1; and FIG. 2F is still another enlarged view of the lower end of the turbodrill, also shown partly in section, as indicated by broken lines 2F—2F of FIG. 2.

With reference now to the details of the abovedescribed drawings, the apparatus indicated in its entirety by reference character 20, and shown in each of FIGS. 1A and 1B, is connected in the lower end of a drill string disposed within a well bore 21 for use in drilling a hole therein. The apparatus comprises a tubular body 23 which is suspended from drill pipe (not shown) extending upwardly to suitable pipe rotating equipment at the wellhead, and connected to a drill bit 22 at its lower end, so as to form a rotatable shaft member for transmitting rotation to the bit.

The tubular body has a bore 24 therethrough adapted to form a continuation of the bore through the drill pipe for conducting drilling mud from the surface to the drill bit 22. The bit is shown to be of conventional construction comprising a hollow shank 22A at its upper end threadedly connected to a box 25 on the lower end of tubular body 23. As shown in FIGS. 1A and 1B, a plurality of cone-shaped rollers 26 are rotatably mounted on the lower end of the bit for rotating in engagement with the lower end of the well bore as the drill string is rotated with the well bore. As shown in FIG. 1A, a plurality of passageways 27 are formed in the lower end of the bit to connect the hollow shank with spaces between the rollers 26, and a jet nozzle 28 is removably connected in each such passageway so as to form a restricted opening 29 therethrough, which causes the drilling mud within the drill string to be jetted between the rollers with considerable force.

As previously described, the bore 24 of the tubular body 23 is normally closed by a closure member 30, as the string is lowered into the well bore, so as to prevent well fluid from circulating upwardly through the restricted openings 29, and thus causing such openings to be clogged by cuttings and other debris. As shown, the closure member 30 comprises a flapper 31 which is pivotally mounted on a pin 32 for swinging between the position shown in FIG. 1A, wherein it is disposed across a seat 33 in the bore 24 to close same, and the position shown in FIG. 1B, wherein it is swung downwardly to a position removed from the seat to open the bore. As shown, the flapper is urged to closed position by a spring 38 surrounding the pivot pin 32. More particularly, the pivot pin 32 is mounted on a liner 34 having a lower end which is seated on the upper end of the shank 24 of the bit, and an upper end which is engaged with a downwardly facing shoulder 35 on the upper end of a recessed portion of the bore 24 of the body 23. The liner carries seal rings 36 for sealably engaging such recessed portion, and has a window 37 cut in its side to receive the pin 32 and flapper when the flapper is swung downwardly to open position, thereby providing a substantially full opening through the bore of the tool body.

As previously described, the improved apparatus of the present invention avoids the necessity, in the use of drill strings having float valves of this type, of progressively filling the drill string with drilling mud from the closure member on up, as the drill string is lowered into the well bore, by providing the tubular body with means which permits the drill string to be filled with well fluid automatically in response to its being lowered into the well bore. Thus, a plurality of ports 40 are formed in the body above the seat 33, and thus above flapper 31, preferably on three levels and in staggered relation circumferentially about the tool body, although other arrangements are possible. In any event, the inner ends of the ports are normally closed by a sleeve 41 of rubber or rubber-like material supported within the bore 24 of the tool above the ports. Thus, as best shown in FIG. 1B, the sleeve is of such size, that its outer diameter normally fits closely within the bore 24 and thus tightly over the ports 40 to close them. Thus upper end of the sleeve is carried from a ring 43 which is of rigid material and has an outer diameter which fits closely within the bore 24 and is held in a desired vertical position therein by means of screws 44. As shown, the sleeve is reinforced by imbedded, vertically extending metal fingers which urge its lower end to its cylindrical shape to close the ports.

As indicated in FIG. 1A, when the fluid pressure externally of the body — i.e., within the annulus between the well bore and the drill string — reaches a predetermined excess over that within the bore 24, and thus over that acting against the inner diameter of the sleeve 41, the lower end of the sleeve will be flexed inwardly so as to open the ports and thereby permit well fluid to enter the bore of the tool. Thus, as the tool is lowered within the well bore, the greater pressure in the annulus will cause the tool to begin to fill up with well fluid as the string continues to be lowered into the well bore, and thereby prevent it from being collapsed. When the drill string has been lowered into drilling position, as indicated in FIG. 1B, drilling mud is circulated downwardly through the drill string, and thus into the bore 24, to urge the sleeve 41 to its closed position of FIG. 1B, and force the flapper 31 downwardly to open position to permit the drilling mud to be circulated downwardly through the jet openings in the bit, and thus upwardly within the annulus.

Although well fluid which has been admitted to the body 23 through ports 40 will thus be forced through the bit, as mud is circulated downwardly through the string, cuttings or other debris contained therein are no larger than the ports, which are relatively small, and preferably of a diameter no larger than the diameter of the restricted jet openings in the bit, so that the latter are not clogged. Even if the ports are larger than the restricted jet openings in the bit, particles which pass through them may be broken into smaller sizes due to their circulation downwardly through the body 23. Although ports 40 are shown to be cylindrical, they may instead be slits or of other non-circular cross section, with their minimum dimension being preferably larger than the jet openings.

The turbodrill, which is designated in its entirety by reference character 120, is shown in FIG. 2 to be connected in the lower end of a drill string suspended within a well bore 121. The apparatus constructed in accordance with the second mentioned embodiment of the invention, and connected in the upper end of the turbodrill, comprises a tubular body including a tubular member 124 having its upper end connected to drill pipe 122, and a shaft member 125 supported coaxially within the tubular member for rotation with respect thereto extending from the lower end of the tubular member for connection with a bit 123. As will be described to follow, turbine blades are mounted on the tubular member and shaft member within an annular passageway between them to provide a fluid motor which rotates the shaft member and thus the bit in response to the flow of drilling mud therethrough as the mud is circulated downwardly through the drill string and out the bit.

With reference now to the details of the sectional views, the tubular member 124 is shown in FIGS. 2A – 2B to be made up of an uppermost tubular section 124A threadedly connected to the lower end of the drill string 122 and extending downwardly to a connection at its lower end to a next lower tubular section 124B. The latter section is in turn connected at its lower end to a tubular section 124C, shown in FIGS. 2C and the top of FIG. 2D, to make up the outer housing for the fluid motor of the turbodrill. The lower end of the section 124C is in turn connected to the upper end of the next lower section 124D, and, as shown in FIG. 2E, the lower end of the section 124D is connected to a lower tubular section 124E from which the lower end of the shaft member 125 extends.

The shaft member 125 is also made up of a plurality of interconnected tubular sections, including an uppermost section 125A which is shown in FIG. 2C to extend downwardly within the tubular section 124C of the tubular member 124 to form the inner housing portion for the fluid motor. The lower end of the section 125A is connected to a section 125B which extends downwardly through the lower end of tubular member section 124C and the upper end of tubular member section 124D, and the lower end of tubular section 125B is in turn connected to the upper end of a tubular section 125C which, as shown in FIGS. 2D and 2E, extends within the tubular section 124D of the tubular member 124. The lower end of section 125C extends downwardly through the lowermost section 124E of the tubular member for threaded connection at its lower end to the drill bit 123, as shown in FIG. 2F.

As shown in FIGS. 2C and 2D, the outer diameter of the tubular sections of the shaft member 125 are spaced from the inner diameter of the tubular sections of the tubular member 124 so as to provide an annular passageway 129 between them. As shown in FIG. 2C, a series of stator elements 131 are mounted on the section 124C of the tubular member, and a plurality of rotor elements 132 are mounted on the section 125A of the shaft member 125 to provide a multi stage turbine motor in the passageway 129.

Drilling mud circulating downwardly through the drill string 122, and thus into the upper end of the tubular member 124, is diverted into the passageway 129 by means of a cap 135 on the upper end of a hollow portion of the shaft member section 125A. Upon flow downwardly through the passageway 129, and thus through the turbine blades, most of the drilling mud passes through large ports 137 in shaft member section 125B, and thus into the interior of the shaft member 125B below the lower closed end 138 of the hollow shaft member portion for circulation downwardly to the drill bit.

Additional ports 140, which are considerably smaller than the ports 137, are provided in the tubular section 125C of the shaft member. Thus, some drilling mud is caused to flow into and downwardly through a smaller passageway 130 between the tubular member and shaft member, and thus into the interior of the shaft member section 125C, where it is combined with the more substantial flow of mud through the ports 137 for circulation to the bit. A seal assembly, which is designated in its entirety by reference character 141, is shown in FIG. 2D to be positioned between the shaft member and tubular member, and particularly between tubular member section 124D and shaft member section 125C for diverting substantially all of the flow through the passageways 129 and 130 into the ports 137 and 140.

As shown in FIGS. 2D and 2E, a lower annular passageway 142 between the shaft member and tubular member beneath the seal assembly 141 is of relatively large crosssectional area for a substantial extent of its length downwardly to the section 124E of the tubular member. As shown in FIG. 2E, thrust bearings 143 are disposed within this passageway portion to support the shaft member from the tubular member for rotation with respect to it. The bearings are contained within a lubricant chamber which is defined vertically between upper and lower seal rings 144 and 145 mounted for sliding vertically between the shaft member and tubular member. Ports 146 are provided in the tubular section 124D, outwardly of the seal assembly 141, so that drilling mud in the annulus has access to the passageway 142 above the seal ring 144. Drilling mud in the annulus also has access to the lower side of the seal ring 145 through ports 147 in the tubular section 124D at the lower end of passageway 142, as well as through grooves 134a in a bearing sleeve 134 fluidly connecting the lower open end of the tubular member with the lower end of passageway 142.

With reference now to the details of the apparatus of the present invention, and as shown in FIG. 2B, a cage 191 is mounted in the bore through section 124A of the tubular member 124 to support a closure member 196 in position to move between positions opening and closing the bore. The cage includes a sleeve 192 at its upper end which is held against a shoulder 194 in the bore to provide a downwardly facing seat 195 in the bore with which the closure member 196 is engageable to close the bore. The cage is supported in this position by the engagement of its lower end with the upper end of a screen 202, and the screen is in turn supported on the tubular member by connection at its lower end to the upper end of tubular section 124B.

The lower end of the sleeve 192 of the cage supports a collar 197 by means of ribs 198 extending between it and the collar, and a stem 199 extending downwardly from the closure member 196 is vertically slidable within the collar. Coil spring 200 surrounds the stem 199 and bears between the upper end of the collar and the lower end of the closure member to normally urge the closure member upwardly to closed position. As shown in FIG. 2B, the upper surfaces on the closure member are downwardly and outwardly tapered, so as to define a conically shaped opening between them and a similarly shaped surface on the seat 195, when the closure member is moved to the open position shown in FIG. 2B. Also, the sleeve of the cage is open between vertical ribs 201 to facilitate the free flow of drilling mud downwardly therethrough past the closure member.

As will be appreciated, when the tool is being run into the well bore, the closure member 196 is urged upwardly to closed position, which prevents well fluid from circulating upwardly through the tool. Although the closure member is located above the fluid motor, it will permit only a relatively small amount of well fluid to pass through the motor as the well fluid fills the lower end of the tool. Therefore, there is little likelihood of cuttings or other debris in the well fluid becoming clogged in the fluid motor.

As previously described, and as shown in FIG. 2A, a series of ports 205 are formed in the section 124A of the tubular member above the closure member, and a generally cylindrical sleeve 206 of rubber is supported in the bore of the tubular section 124A in a position to normally cover the inner ends of the ports. The sleeve is like the sleeve of the apparatus of FIGS. 1A and 1B in that its upper end is carried by a metal ring 208 which is supported within the bore of the section 124A by means of a screw 209, and its lower end is reinforced by downwardly extending metal fingers 209a. Also, the lower end of the sleeve is free to deflect inwardly, as indicated by the dotted lines in FIG. 2A, in response to a predetermined differential between the fluid pressure of the well fluid in the annulus and fluid pressure within the apparatus, so that as the tool is lowered in the well bore, it permits well fluid to flow through the ports 205 and thus fill the string above the closure member 196.

When the string has thus been lowered into drilling position, drilling mud which is circulated downwardly through the drill string will expand the sleeve 206 to its closed position, and force the closure member 196 to open position, so as to flow through the annular passageways for operating the fluid motor. Although well fluid which has been admitted to the body 124 through ports 205 will thus also be forced through the motor, the ports are sufficiently small and preferably no greater than the minimum dimension of the smallest restricted opening through the turbine blades, which is the smallest restriction through the string, to prevent the entry cuttings or other debris which would clog the restricted openings in the motor. As also described in connection with the apparatus of FIGS. 1A and 1B, the ports may have a cross section other than circular, their minimum dimension in any case being preferably less than the minimum dimension of the restricted openings in the motor. Furthermore, and as indicated in connection with the apparatus of FIGS. 1A and 1B, even if the ports are larger than the restricted openings in the motor beneath the closure member, particles which pass through them are broken into smaller sizes due to their circulation downwardly through the motor. In fact, when the turbine is operating, the particles may be further broken up due to their being ground up by the rotating turbine blades.

As shown in FIG. 2B, the screen 202 includes a cylindrical portion 210 spaced inwardly of the surrounding bore of section 124A and having a plurality of small holes 211 therein, and an upper end above the holes having enlarged ports 212 therethrough. It also includes a lateral section 213 which is disposed across the cylindrical portion 210 just beneath the ports 212 and has small holes 214 therein, of the same size as the holes 211. The holes 211 and 214 are preferably of generally the same diameter as the ports 205, so that cuttings or other debris in the drilling mud which would otherwise clog the fluid motor will be trapped by the sleeve 195 on the upstream side of the fluid motor. The annular space defined between the cylindrical portion 210 and the oppositely facing bore through the section 124A of the tubular member is sufficiently large to receive a large volume of such cuttings, without the need for pulling the strings.

As shown in FIG. 2A, a plurality of relatively large ports 215 are provided in the tubular section 124A of the tubular member above the sleeve 206. These ports are normally closed by a sleeve 216 supported in the bore by means of an O-ring 217. The outer portion of the O-ring is seated upon an upwardly facing shoulder on the bore of the tubular section 124A, while the inner portion of the O-ring is supported within a shallow groove on the outside of the sleeve 126. The sleeve has an upwardly facing tapered seat 218 onto which a ball (not shown) may be dropped so as to close the bore through the tubular section 124A. This permits fluid pressure to be applied above the ball for the purpose of shearing the ring 217, so as to permit the sleeve 216 to be moved downwardly to open the ports 215. This may be desirable, for example, in the event it is necessary, during a drilling operation, to circulate a large volume of lost circulation material into the annulus of the well bore. Opening of the ports 215 permits this circulation to be accomplished more readily than would be possible if it were necessary to do so through the fluid motor and other restrictions in the tool beneath the ports 215. The lower end of the sleeve carries an O-ring 219 for engaging about the bore of the section 124A below the ports 215, so as to seal off the sleeve above and below the ports 215 when it is in the closed position shown in FIG. 2A.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

The invention having been described, what is claimed is:

1. For use in drilling a well, apparatus comprising a tubular body having upper and lower ends connectible in a drill string, and a downwardly facing annular seat within the bore of the tubular body, a closure member, means mounting the closure member in the bore of the tubular body for movement from a position across the seat to close the bore to a position removed from the seat to open the bore in response to fluid pressure thereabove, means urging the closure member to closed position, a plurality of small ports in the wall of the tubular body connecting the bore of the tubular body above said seat with the exterior thereof, and a sleeve of flexible material having an outer diameter which, in the absence of a difference in fluid pressure in the bore above the seat and exteriorly of the body, fits tightly against the wall of the tubular body throughout substantially its entire length so as to close the ports while providing a substantially uninterrupted flow path through the bore, one end of the sleeve being supported within the bore, and the other end of the sleeve being free to flex inwardly to open the ports in response to fluid pressure exteriorly of the body which exceeds that in the bore above said seat by a predetermined amount, said other end of the sleeve automatically returning to its tight fit against the wall so as to close said ports when said excess in fluid pressure is removed.

2. Apparatus of the character defined in claim 1, wherein said closure member comprises a flapper hingedly connected to the tubular body at one side of the bore.

3. Apparatus of the character defined in claim 1, wherein said closure member comprises a head having a stem vertically reciprocable within a spider mounted across the bore.

4. Well drilling apparatus, comprising a shaft member having a bore therethrough and adapted to be connected in a drill string extending within a well bore, whereby drilling mud may be circulated downwardly through the bore through the shaft member, a drill bit connected to the lower end of the shaft member, said bit having restricted openings through which the drilling mud may be circulated into the annulus about said tool, a closure member mounted in the shaft member for movement between a position closing to a position opening the bore through the shaft member in response to fluid pressure thereabove, means urging said closure member to closed position, a plurality of small ports in the wall of the shaft member connecting the bore of said shaft member with the exterior thereof above said closure member, and a sleeve of flexible material having an outer diameter which, in the absence of a difference in fluid pressure in the bore above the seat and in the annulus, fits tightly against the bore throughout substantially its entire length so as to close the ports while providing a substantially uninterrupted flow path through the bore, one end of the sleeve being supported within the bore, and the other end of the sleeve being free to flex inwardly to open the ports in response to a predetermined excess of fluid pressure within the annulus over that within the bore through said shaft member, said other end of the sleeve automatically returning to its tight fit against the wall so as to close said ports when said excess in fluid pressure is removed.

5. Apparatus of the character defined in claim 4, wherein the minimum dimension of each port is no greater than the minimum dimension of the smallest of the restricted openings.

6. Well drilling apparatus, comprising a shaft member adapted to be connected at its lower end to a drill bit, a tubular member having a bore therethrough and disposed in spaced relation about the shaft member to provide passageway means therebetween, means on the members supporting one from the other for rotation with respect thereto, means for suspending the other member from a drill string extending within a well bore, whereby drilling mud may be circulated downwardly through the bit and upwardly within the annulus between the drill string and well bore, means on the members within the passageway means for rotating said one member in response to the flow of drilling mud downwardly therethrough, a closure member mounted in the tubular member for movement between a position closing to a position opening the bore therethrough above said passageway means in response to fluid pressure thereabove, means urging said valve member to closed position, a plurality of small ports in the wall of the tubular member connecting the bore of said tubular member with the exterior thereof above said closure member, and a sleeve of flexible material having an outer diameter which, in the absence of a difference in fluid pressure in the bore above the seat and in the annulus, fits tightly against the wall of the tubular member throughout substantially its entire length so as to close the ports while providing a substantially uninterrupted flow path through the bore, one end of the sleeve being supported within the bore, and the other end of the sleeve being free to flex inwardly to open the ports in response to a predetermined excess of fluid pressure within the annulus over that within the bore through said tubular member, said other end of the sleeve automatically returning to its tight fit against the wall so as to close said ports when said excess in fluid pressure is removed.

7. Apparatus of the character defined in claim 6, wherein the minimum dimension of each port is no greater than the minimum dimension of the smallest opening through the rotating means.

8. Apparatus of the character defined in claim 7, including a screen across the bore of said tubular member intermediate said closure member and said passageway, the minimum dimension of the openings in said screen being of generally the same size as the minimum dimension of the ports.

9. Apparatus of the character defined in claim 6, wherein said rotating means comprises turbine blades on the members within the passageway means.

* * * * *